Figures 1, 2:
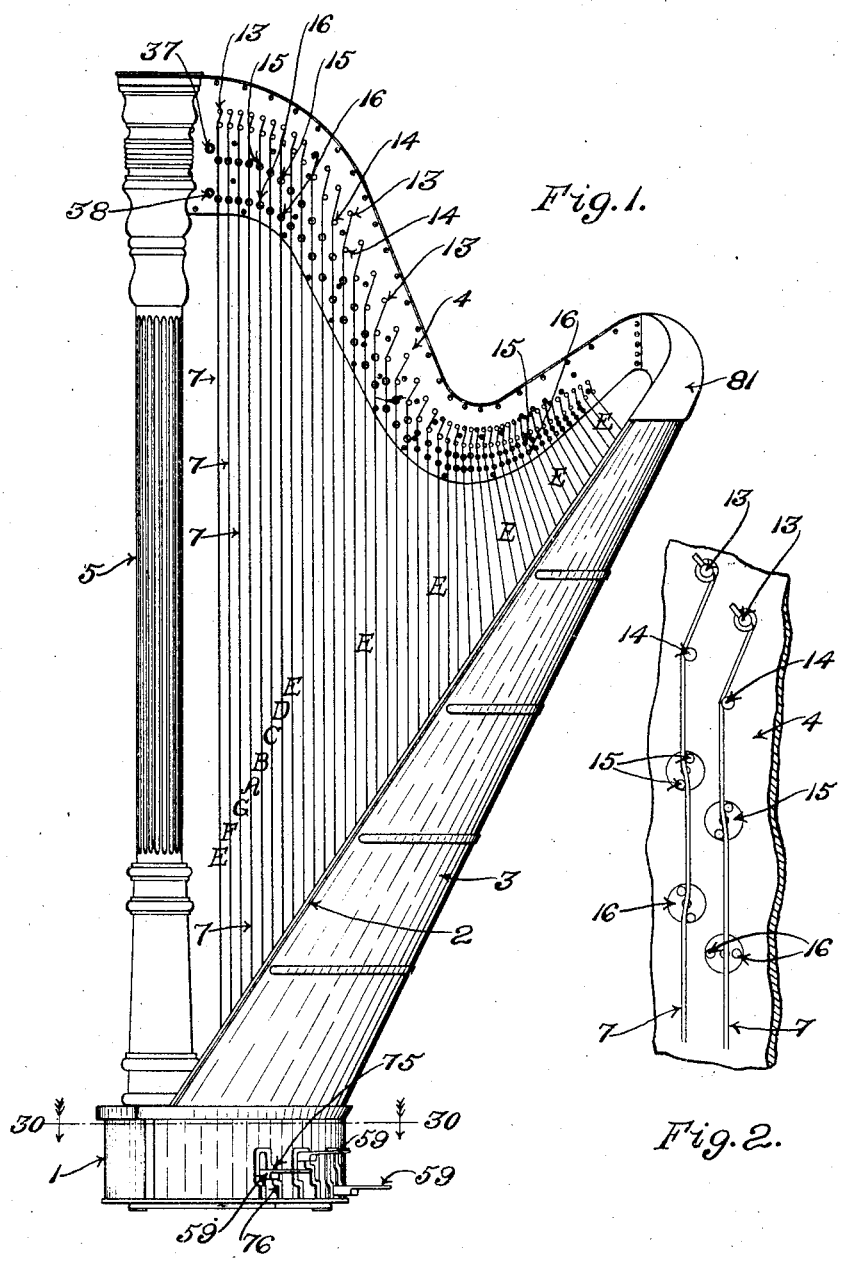

No. 786,275. PATENTED APR. 4, 1905.
P. E. EKMAN.
HARP.
APPLICATION FILED OCT. 24, 1904.

5 SHEETS—SHEET 1.

Witnesses:
J. Henry Parker
Oscar F. Hill

Inventor:
Per Erik Ekman
by Wm A. Copeland
Attorney.

No. 786,275. PATENTED APR. 4, 1905.
P. E. EKMAN.
HARP.
APPLICATION FILED OCT. 24, 1904.
5 SHEETS—SHEET 2.
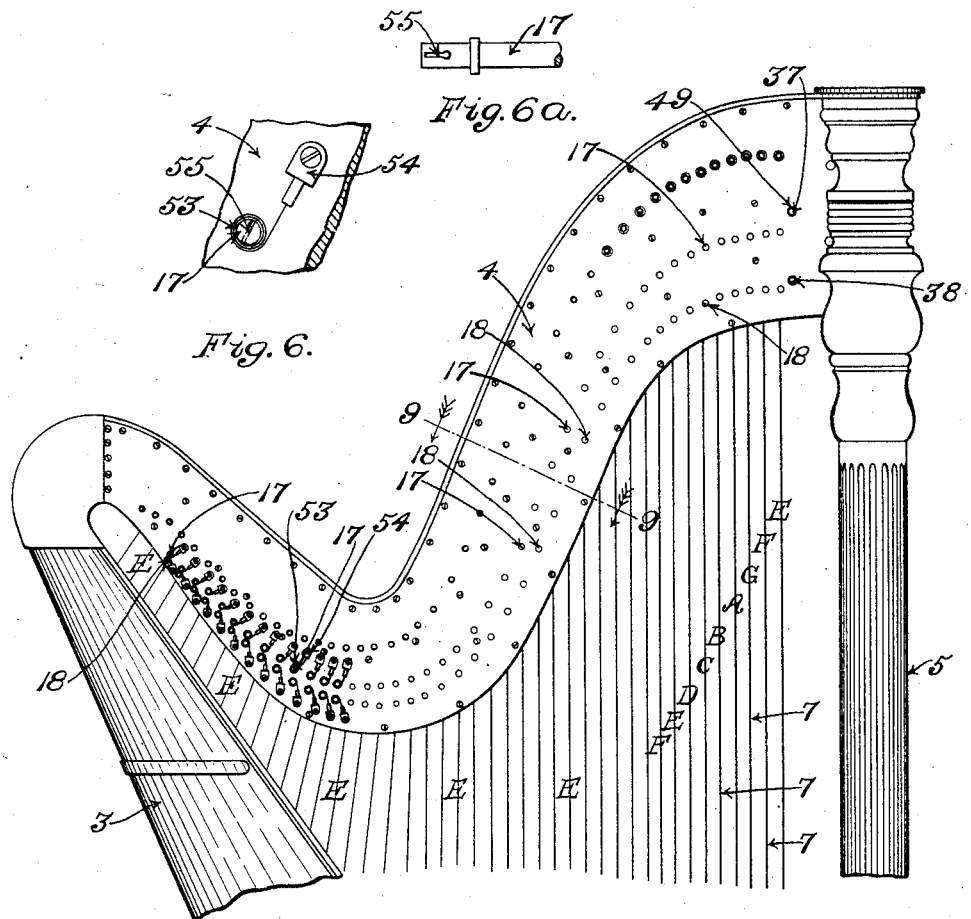
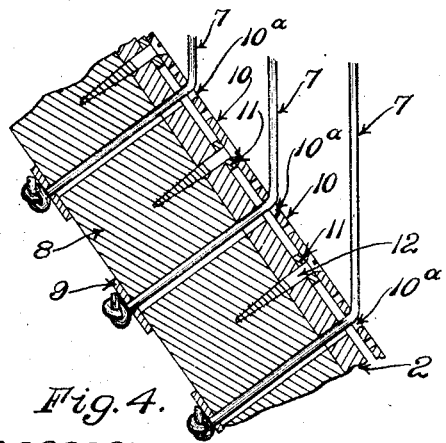
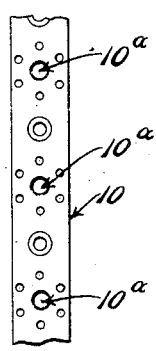
Witnesses:
J. Henry Parker
Oscar F. Hill
Inventor:
Per Erik Ekman
by Wm A. Copeland
Attorney.

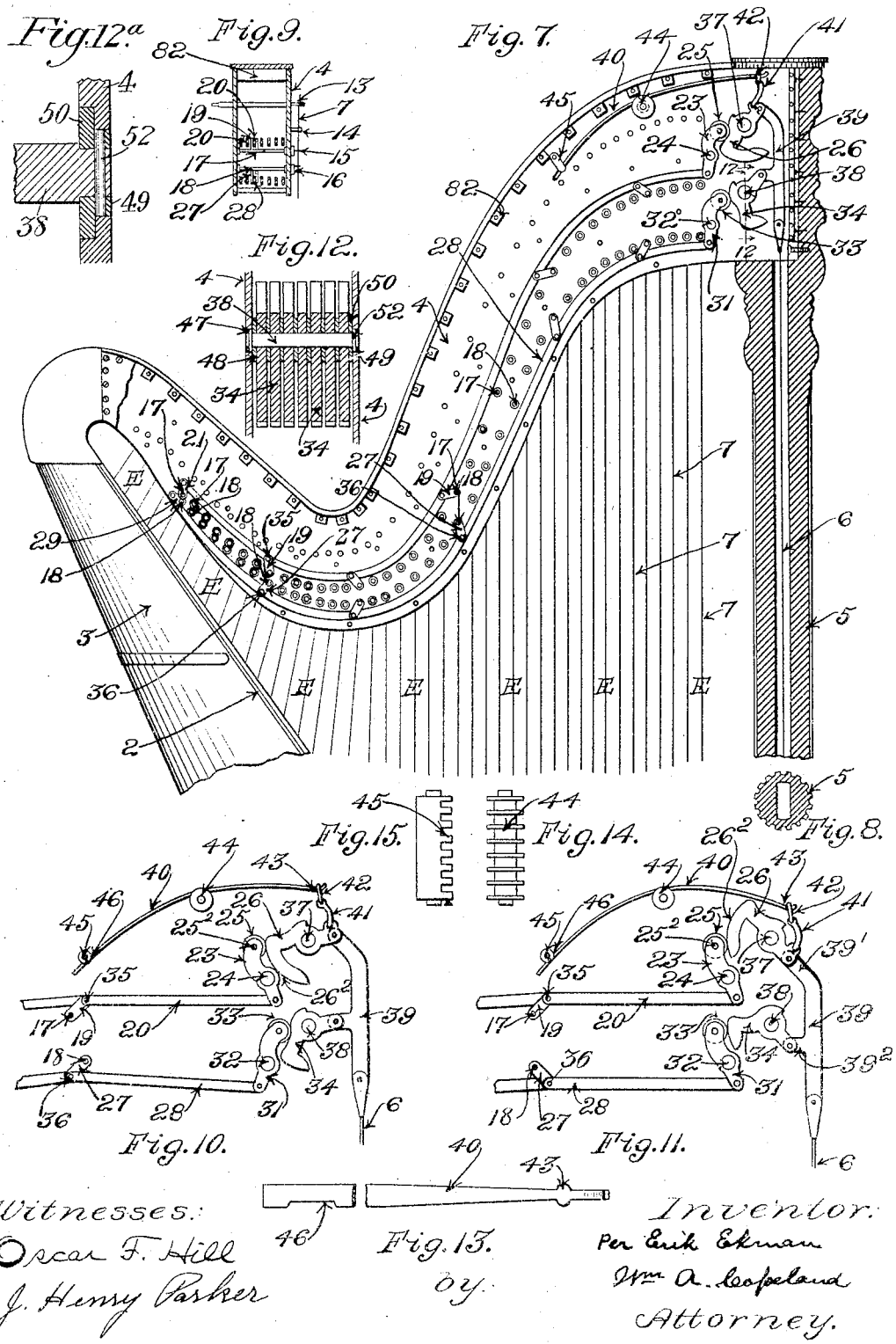

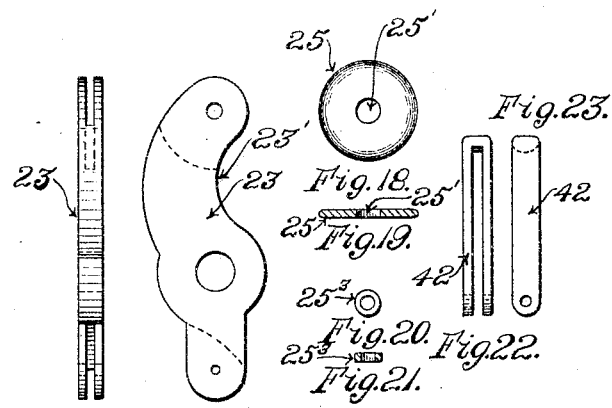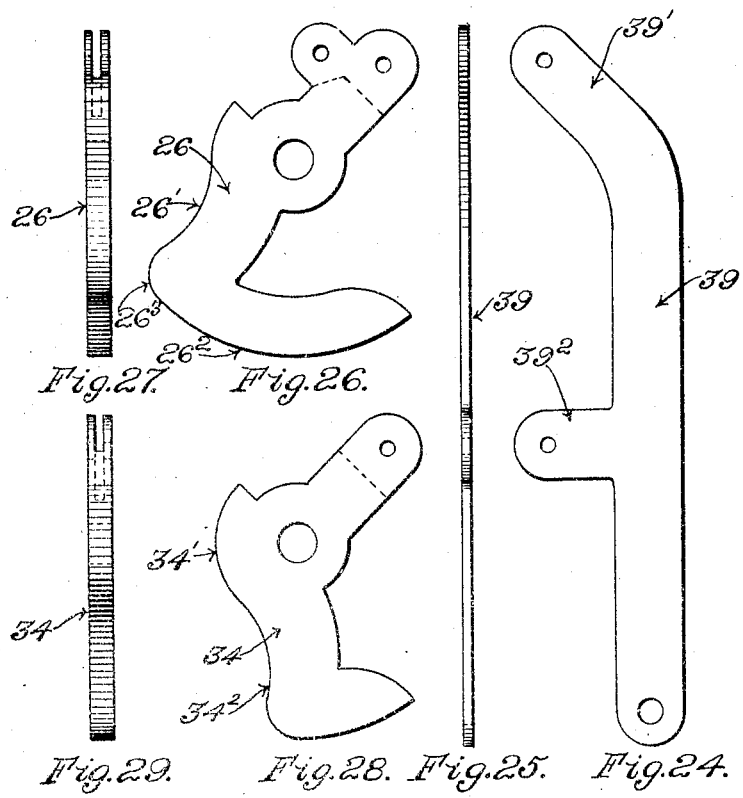

No. 786,275. PATENTED APR. 4, 1905.
P. E. EKMAN.
HARP.
APPLICATION FILED OCT. 24, 1904.
5 SHEETS—SHEET 5.
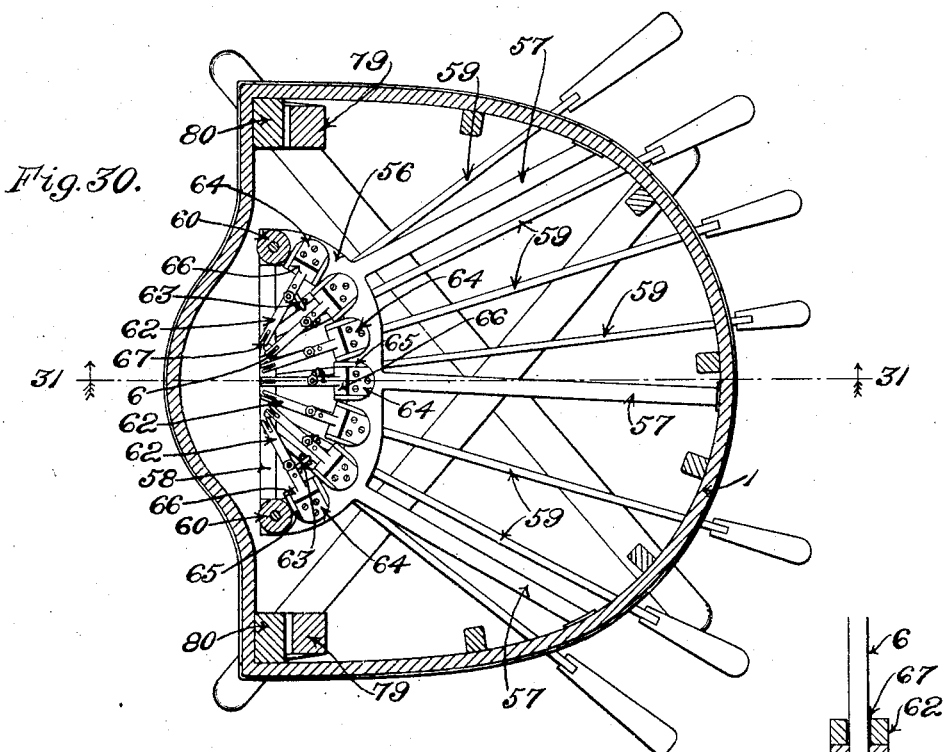
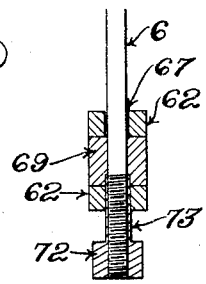
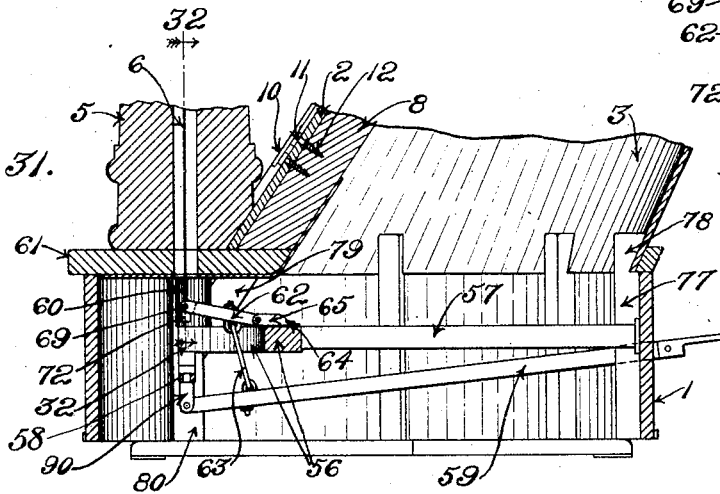
Witnesses:
J. Henry Parker
Oscar F. Hill
Inventor:
Per Erik Ekman
by Wm. A. Copeland
Attorney.

No. 786,275.

Patented April 4, 1905.

UNITED STATES PATENT OFFICE.

PER ERIK EKMAN, OF WOBURN, MASSACHUSETTS.

HARP.

SPECIFICATION forming part of Letters Patent No. 786,275, dated April 4, 1905.

Application filed October 24, 1904. Serial No. 229,710.

*To all whom it may concern:*

Be it known that I, PER ERIK EKMAN, of Woburn, in the county of Middlesex and State of Massachusetts, have invented certain new and useful Improvements in Harps, of which the following is a specification.

The invention relates to a harp; and the special object is to provide a new and useful harp-action.

The main feature of the invention relates to the mechanism for actuating the forks or pins by which the strings are raised either a half-tone or a full tone, as desired. A part of the mechanism—that which directly operates the forks—is contained in the neck of the harp, and the said operating mechanism is actuated by pedal mechanism contained in the pedal-box and intermediate connecting mechanism which passes up inside of the post from the pedal-box to the neck.

Various features of the invention relate to different parts of the action both in the neck and in the pedal-box.

The invention will now be fully described, reference being had to the accompanying drawings, and the novel features thereof will be particularly pointed out in the claims at the close of the specification.

In the drawings, Figure 1 is a side elevation of a harp embodying the invention. Fig. 2 is an enlarged detail elevation of a portion of the neck to show the action of the forks on the strings. Fig. 3 is a side elevation on the opposite side from that shown in Fig. 1, the lower part being broken away. Fig. 4 is a detail sectional view, partly broken away, through the sounding-board and stays to show the method of fastening the strings. Fig. 5 is a detail elevation, broken away, of the stay-strip on the outside of the sounding-board. Fig. 6 is an enlarged detail elevation of a portion of the neck, showing one of the springs which keeps under tension the chain-levers which operate the forks. Fig. 6ª is a detail showing the slit in one of the shafts for attaching the spring. Fig. 7 is a sectional elevation of Fig. 3, showing the parts in the neck which operate the forks in the normal position. Fig. 8 is a cross-section of the post. Fig. 9 is a cross-section on line 9 9 of Fig. 3. Fig. 10 is a diagram of the operating parts of the action in the neck in the position that they occupy when the pedal has been depressed to move the upper fork to raise one of the strings a half-tone. Fig. 11 is a diagram showing the same parts as in Fig. 9 when the pedal has been depressed far enough to move the lower fork and raise the string a whole tone. Fig. 12 is a detail sectional view through the neck and fulcrum-shaft of one of the cam-levers on line 12 12 of Fig. 7. Fig. 12ª is an enlarged sectional detail showing the manner of connecting one of the fulcrum-studs of the cam-levers with one of the side plates of the neck. Fig. 13 is a detail plan of one of the springs which give tension to the cam-levers. Fig. 14 is a detail view of the spool-shaped fulcrum over which the springs shown in Fig. 13 pass. Fig. 15 is a detail view of the guide which engages the tail end of the springs shown in Fig. 13. Figs. 16 and 17 are detail views of one of the levers connected with one of the chains and which is engaged by the cam-lever. Figs. 18 and 19 are detail views of the roller connected with the lever shown in Figs. 16 and 17. Figs. 20 and 21 are detail views of the bushing in the roller shown in Figs. 18 and 19. Figs. 22 and 23 are detail views of one of the links which connect the cam-lever with its spring. Figs. 24 and 25 are detail views of the connecting-rod which connects one of the wires with one of the cam-levers. Figs. 26 and 27 are detail views of one of the upper series of the cam-levers which actuate the forks to raise the string a half-tone. Figs. 28 and 29 are detail views of one of the lower series of cam-levers which actuate the forks to raise the string another half-tone after it has been raised a half-tone by the first lever. Fig. 30 is a cross-section through the pedal-box on line 30 30 of Fig. 1. Fig. 31 is a vertical section through the pedal-box on line 31 31 of Fig. 30. Fig. 32 is a sectional detail showing the method of connecting one of the wires with the operating-lever in the pedal-box on line 32 32 of Fig. 31.

1 represents the pedal-box, in which the pedal-action is contained; 2, the sounding-board, to which the lower ends of the strings are fastened; 3, the body; 4, the neck, which holds the connections for the upper ends of the strings and the fork-pins and the fork-action, and 5 the post, through which the wires 6 pass from the pedal-action to connect with the fork-action. The strings 7 are also indicated by the letters C D E F G A B, as usual in musical notation. The strings of the same note in all the octaves are controlled by one pedal and pedal connection, there being seven pedals to correspond with the different notes and a separate pedal-action and wire and fork-action for each pedal. A description of one set of actions and connections will answer for all.

For the purpose of strengthening the sounding-board 2 down the middle where the strings are connected and to take the strain from the board there is preferably secured on the inner face of the sounding-board a comparatively thick stay-strip 8, extending lengthwise thereof, having holes through which the string pass. (See Figs. 4 and 31.) Preferably there are washers 9 on the face of the stay-strip to receive the pressure of the knotted ends of the strings. Secured to the outer face of the sounding-board is also a narrow metal strip 10, which is preferably raised slightly from direct contact with the sounding-board by blocks 11. The stay-bar 8 and strip 10 are secured to the sounding-board by screws 12.

The upper ends of the strings are secured to the tuning-pins 13, being engaged by the pins 14 for the natural tone, each string passing between the arms of one of the upper set of forks 15 and of one of the lower set of forks 16, by the operation of which the strings are raised to half-tones. The fork-pins 15 16 are mounted on shafts 17 18, respectively, which pass transversely through the neck and are journaled in the side plates of the neck 4. (See Fig. 9.) Each one of the upper series of shafts 17 is connected by a lever 19 with the link-pin 35 of two adjoining links in one of the chain-levers 20. The tail end of each of said chains 20 is pivoted to a lever 21, which is fulcrumed on a stud 17, and the other end of each of said chains is connected with one end of a lever 23, fulcrumed on a stud 24. The other end of said lever 23 is provided with a roller 25, which is engaged by the cam-lever 26, fulcrumed on stud 37 to actuate the upper series of chain-levers 20 and the upper series of forks 15 to engage the strings and raise them a half-tone, as will be hereinafter described. The central hole 25' of the roller 25, through which its shaft $25^2$ passes, is preferably provided with a bushing $25^3$. (See Figs. 18, 19, 20, 21.) Each of the lower series of shafts 18 is connected by a lever 27 with the link-pin 36 of two adjoining links in one of the chain-levers 28. One end of each of said chains 28 is pivoted to a lever 29, which is fulcrumed on a stud 18, and the other end of each of said chains is connected with one end of a lever 31, fulcrumed on a stud 32. The other end of said lever 31 is provided with a roller 33, which is engaged by the cam-lever 34 on stud 38 to actuate the lower series of chains 28 and the lower series of forks 16 to engage the strings and raise them another half-tone. All unnecessary metal is cut away from cam-levers 26 and 34 to reduce the weight. There are seven chains 20 in the upper series, placed side by side parallel with each other, one for each note in the octave, each of said chains 20 being pivoted at the forward end to a separate lever 23, and all of said levers 23 are fulcrumed on one stud 24, being separated from each other by washers. There are also seven cam-levers 26 on stud 37 to actuate the chains separately. (See Fig. 12.) The tail end of each chain terminates with the last string, which it is intended to actuate. For instance, the chain which controls the E-string will continue only far enough to actuate the shortest E-string, and the chain which controls the D-string continues far enough to actuate the shortest D-string, and so on. There are also seven chains 28 in the lower series, arranged in a similar manner as the upper series of chains 20 and all pivoted at the forward end to separate levers 31, fulcrumed on stud 32.

Both cam-levers 26 and 34 are pivoted at one end to a connecting-rod 39, whose lower end is connected with one of the wires 6, which pass down through the post 5 to the pedal-action. The upper end of connecting-rod 39 has a flexible connection with a spring 40, which retains the connecting-rod 39 and the wire 6 under tension. The said flexible connection, as shown, consists of two members—that is, a link 41, one end of which is pivoted to the cam-lever 26 and the other end of which is pivoted to a bifurcated link 42. (See Figs. 10, 11, 22, 23.) The upper part of lever 39, to which cam-lever 26 is pivoted, is formed with an obtuse-angled bend 39' for convenience in hitching the cam-lever 26 both to the rod 39 and to the link 42. The connecting-rod 39 is also formed with an arm $39^2$, to which cam-lever 34 is pivoted to afford an offset to prevent the toe of cam-lever 34 from striking the rod 39 when the parts are in the normal position shown in Fig. 7.

One end of the spring 40 engages with the link 42, preferably being narrowed toward the end to pass between the legs of the link 42 and pressing up against the upper end of the bow of the link and is slightly upturned at the end to retain the link in proper position with relation to the spring and is formed with ears 43. (See Fig. 13.) The spring passes over a groove in a spool 44, which forms a fulcrum over which the spring is bent when the forward end is pulled down, (see Figs. 10, 11, and 14,) and the tail end is retained by a grooved or notched guide or comb 45, Figs. 10, 11, and 15, the spring passing through a groove on the under side of the guide, because when the forward end of the spring is pulled down the pressure of the tail end will be upward. The spring, which is a plate-spring, is formed with a notch or neck 46, Fig. 13 to fit in one of the notches in the guide 45, the shoulders at each end of the notch 46 in the spring forming guards to prevent displacement of the spring. The spool 44 and the guide 45 will each be formed with seven grooves to receive the seven springs 40 belonging to the seven sets of actions. (See Figs. 14 and 15.)

When the wire 6 is pulled down during the first half of the downward movement, the cam-levers 26 and 34 will be turned from the normal position shown in Fig. 7 into the position shown in Fig. 10. The curve of the back 26' of the cam-lever 26 is such that during this first half movement it will turn the lever 23 into the position shown in Fig. 10, thereby pulling forward the chain 20 and moving the levers 19, and thus turning the upper series of forks 15 into contact with the string, as shown on the right-hand string in Fig. 2. The cam-lever 34 will also be turned on its fulcrum during the said first half of the downward movement of the wire; but the outward curve 34' in its back is of such form that it will not move the lever 31. During the latter half of the downward movement of the wire 6 the cam-levers 26 and 34 will be turned into the position shown in Fig. 11. The foot $26^2$ of the cam-lever 26 is outwardly curved in such form that it will ride over the roll 25 without turning the lever 23 any farther, and the lever 23 is formed with an inward curve 23' to afford clearance for the heel $26^3$ of lever 26; but the rise $34^2$ in the curve on the back of the cam-lever 34 comes into engagement with roller 33 and turns lever 31 on its fulcrum and moves chain 28, so as to turn levers 27, and thus turn the lower series of forks 16 into engagement with the same strings as previously engaged by forks 15, and thus raise the strings another half-tone, as shown on the left-hand string of Fig. 2.

The fulcrum-studs 37 and 38, on which the cam-levers 26 and 34, respectively, are mounted or journaled in the side plates of the neck 4, extend across from one side plate to the other. (See Fig. 12.) In assembling the parts the reduced end of one end of the fulcrum-stud 38 is inserted in the hole made to receive it in one of the side plates and is provided with a collar 47, which forms a bushing having a flange 48, which bears against the inner face of the side plate. The other end of the said stud is formed with a reduced end, on which is mounted a collar 49, which serves as a bushing to fit the hole in the other side plate of the neck 4. The said collar 49 is removable, and before it is placed on the stud the seven cam-levers 34 and washers which separate them from each other are all placed in position. The collar 49 is then put onto the end of the stud, abutting against the shoulder formed on the stud. The said collar 49 is formed with a flange 50. A pin-hole extends through the reduced end of the stud 38 and through the collar 49. A pin 52 is then inserted through the hole in the collar and stud, not extending beyond the edge of the collar. The second side plate of the neck is then placed in position, with the end of the stud 38 and the collar or bushing 49 passing through the hole formed in the side plate to receive them, and the side plate is secured. Cams 26 are mounted on stud 37 in the same manner as described for cams 34. The edges of the hole in the side plate prevent the pin 52 from endwise movement and securely lock the stud 37. When the side plate is removed, the pin may be removed and the parts dismembered again. Fulcrum-stud 38 is secured in the same manner as stud 37.

In order to retain the rollers on the levers 23 and 31 in constant contact with the respective cam-levers 26 and 34, so as to pull the chains 20 and 28 back and release the forks from the strings when the pedal is released, one or more springs 53 are provided for the shafts 17 and 18. For such purpose the shafts on which the springs are mounted project outside the neck of the harp. In Figs. 3 and 7 the shafts 17 and 18 for all seven chains 20 28 in both the upper and lower series are shown, because the joints of the links come at different intervals; but it is only every seventh shaft in each series that belongs with any one chain, as shown in Fig. 7. For instance, reckoning from the left hand of Figs. 3 and 7, the first and the eighth shaft and spring belong with the chain shown in Fig. 7. It is preferable to have springs on two shafts of all the chains except the shortest one, E. The form of springs 53 shown are coil-springs, one end secured to the shaft and the other end secured to a block 54, screwed to the neck 4. (See Fig. 6.) The preferred method of securing the spring to the shaft is by having the end of the spring enter a slit or thin hole 55 formed in the shaft. (See Fig. 6.)

The pedal-action and connection with the pedal-box will now be described.

The support for the pedal-action is a bracket consisting of a segment of arc-shaped casting 56, to which the link connections, with the wires 6, are attached, and having radiating arms 57, which are secured to the wall of the pedal-box 1 by screws or any suitable means and having a cross-bar 58, to which the pedal-rods 59 are connected. Each pedal-rod 59 is pivoted to a stud 90, which has a swiveling connection with the cross-bar 58 in order to permit a lateral movement to the pedal-rod to allow the pedal-rod to be locked and released from its adjusted positions. The studs 90 extend downward from the cross-bar 58, and the pedal-rods are pivoted to the lower ends of the studs. The pedal-rods extend underneath the segmental casting 56 and pass out through openings in the wall of the pedal-box. In order to allow sufficient play for the pedal-rod and levers 62 up and down, the cross-bar 58 should be some distance lower than the segmental casting. It may be cast integral with the segmental casting and an offset formed in the casting, so as to bring the cross-bar at a lower level, or the cross-bar may be cast as a separate piece and screwed to the segmental piece. The bracket may be further secured to the pedal-box by screws passing through the segmental piece 56 near the ends and through blocks 60 and up into the base-board 61.

The wires 6 are pivotally connected with one end of levers 62, the other end of said levers being hinged to the segmental piece 56. The said levers 62 are connected by links 63, intermediate between their ends, with the pedal-rods 59. The preferred method of hinging the levers 62 to the segmental piece 56 is as follows: Brackets 64, one for each lever 62, are secured to the upper side of the segmental piece 56, each being formed with ears 65, which project over the edge of the segmental piece, and the lever 62 is formed with lugs or trunnions 66, which are journaled in the said ears 65. The preferred method of pivotally connecting the wires 6 with the levers 62 is as follows: Each lever 62 is bifurcated at the pivot end by a vertical slot 67 (see Figs. 30 and 32) and is formed with a hole transversely through the ears formed by the bifurcation 67 to serve as bearings for the pivot-shaft 69 of the wire 6. A short shaft 69 is journaled in the hole in the ears and is formed with a hole through which the wire 6 passes. A nut 72 is screwed onto the threaded lower end of the wire 6, said nut being formed with a neck 73 on its upper end, which is thin enough to pass between the bifurcations of the lever 62. When the wire is adjusted with the nut in this position, the nut is securely locked and cannot be turned without pulling the wire down far enough to withdraw the neck of the nut from between the bifurcations of the lever 62. Preferably the shaft 69 is formed with a groove to receive the end of the neck 73.

In order to retain the pedals in their adjusted positions, whether half down or full down, there are formed steps 75 76 in the sides of the openings in the pedal-box, through which the pedal-rods pass. (See Fig. 1.)

The braces 77, which secure the body 3 to the pedal-box 1, are preferably formed with a mitered end 78 to receive the slanting wall of the body.

On the inner face of the sounding-board 2, near its lower end at the edges where it joins the body, there are stay-bars 79, which are mortised into stay-bars 80, secured to the walls of the pedal-box.

Preferably the neck 4 is made of aluminium, and the elbow 81, which connects the neck with the body, is also hollow and made of aluminium. The top plate of the neck is joined to the side plates by means of cross-pieces 82, which are screwed to the top plate and to the side plates.

What I claim is—

1. A harp having forks for engaging the strings to raise them a semitone, mechanism for turning said forks to engage the strings, a lever fulcrumed intermediate its ends, mechanism connecting one end of said lever with said turning mechanism, a bell-crank cam fulcrumed intermediate the ends of one of its arms, mechanism for rocking said cam on its fulcrum, said cam having a concave surface in its fulcrumed arm which during a part of the rocking movement engages said first-mentioned lever and actuates the said forks, and a convex surface which engages said lever during the remainder of the rocking movement of the cam without moving the said forks.

2. A harp having forks for engaging the strings to raise them a semitone, mechanism for turning the forks, a lever and intermediate connecting mechanism which operates said turning mechanism, a bell-crank cam fulcrumed intermediate the ends of one of its arms and engaging said operating-lever, said fulcrumed arm being branched, mechanism for operating said cam connected with one of said branches, and a spring for holding said cam under tension having a link connection with the other of said branches.

3. A harp having one set of forks for raising the strings a semitone, another set of forks for raising them a second semitone, separate mechanism connected with each set of forks for operating them successively, a lever connected with each set of operating mechanism, separate rocking cams which engage said levers, a link having two offset arms with which respectively both of said cams are pivotally connected, and mechanism connected with said link to actuate said rocking cams.

4. A double-action harp having one set of forks for raising the strings one semitone and another set of forks for raising the strings another semitone, rock-shafts on which said forks are mounted, chains having operating connections with said rock-shafts, bell-crank cam-levers fulcrumed intermediate their ends having concave backs and convex feet, pedal mechanism and intermediate mechanism connecting with one end of each of said cam-levers, levers fulcrumed intermediate their ends and pivoted at one end to the forward ends of the chains, the other end of each of said last-mentioned levers having a roller which is engaged by its respective cam-lever, and having concave front faces to afford clearance for the cams.

5. A double-action harp having one set of forks for raising the strings one semitone and another set for raising them another semitone, bell-crank cam-levers and connecting mechanism actuated thereby for operating said forks, said connecting mechanism including levers which have rollers with which said cams engage to operate the mechanism for turning the forks, said last levers having concave faces which afford clearance for the toes of the cams.

6. A harp having forks for raising the tone of the strings, a lever and intermediate mechanism for operating said forks, a tension-spring for said operating mechanism having a link connection therewith, said spring having at one end ears which engage said link and having a notch in one side near the other end, a grooved guide with which said notched end engages, and a fulcrum for the spring intermediate its ends.

7. A harp having mechanism for engaging the strings to raise the tone, operating mechanism therefor, a tension-spring for said operating mechanism and a grooved spool which forms a fulcrum for said spring.

8. A harp having a series of mechanisms for engaging the strings to raise the tone, operating mechanisms therefor, a series of tension-springs for said operating mechanisms, said springs being connected at one end with said operating mechanisms, a toothed guide having a series of slots with which the other ends of said springs engage, and means for securing said guide to the neck of the harp.

9. A harp having mechanism for engaging the strings to raise the tone, operating mechanism therefor, a tension-spring for said operating mechanism, a bow-shaped link whose loop is detachably engaged by one end of said spring, the legs of said link being pivotally connected with said operating mechanism, a toothed guide secured to the neck of the harp with which the other end of said spring engages, and a grooved spool secured to the neck which forms a fulcrum for said spring.

10. A harp having a neck, a series of forks for raising the tone of the strings, rock-shafts passing through the neck, said forks being mounted on one end of said rock-shafts outside of the neck, operating mechanism for turning said rock-shafts, and coil-springs around the projecting ends of said rock-shafts, on the opposite side of the neck from the forks, one end of each of said springs being connected with its shaft by engagement with a slot in said shaft and the other end of said spring being secured to the neck of the harp.

11. A harp having mechanism for raising the strings a semitone, mechanism for raising them another semitone, cam-levers and intermediate mechanisms for operating each set of semitone mechanism, an operating-link connected with both sets of cams, pedal mechanism and intermediate connections to actuate said operating-link, a tension-spring connected with said operating-link which restores the link and pedal mechanism to their normal position when the pedal is released after depression, said spring having one end detachably engaged by a grooved guide, and an intermediate slotted fulcrum which engages the spring and over which the spring is bent to increase the tension when the operating-lever is depressed.

12. A harp having mechanisms for raising the strings a semitone or a whole tone, one set of cam-levers and intermediate mechanisms in the neck of the harp for operating the first semitone mechanism, and another set of cam-levers and intermediate mechanisms for operating the second semitone mechanism, thus raising the strings a whole tone, mechanism for actuating said cam-levers, there being seven of said cam-levers in each set, each semitone cam-lever controlling the semitone mechanism for all the strings of a particular note in all the octaves, all of the semitone cam-levers of each set being journaled on one shaft, said neck having removable side plates, bearings in the said side plates in which the ends of said shafts are journaled, the ends of said shafts being reduced in diameter, a flanged collar on the reduced end forming a journal for the shaft, a pin-hole transversely through the reduced end of the shaft, a pin-hole registering therewith through the said collar, and a pin which passes through said pin-holes to fasten the collar to the shaft and which is locked in position by the side plate of the neck when in assembled position.

13. A harp having mechanisms for raising the tone of the strings, cam-levers located in the neck of the harp and connecting mechanism for actuating said pitch-raising mechanism, a series of said cam-levers being mounted on one shaft, said neck having removable side plates, bearings in the side plates in which the ends of the shaft are journaled, the end of the shaft being reduced in diameter forming a shoulder, a flanged collar on the reduced end forming a journal for the shaft, a pin-hole transversely through the reduced end of the shaft, a pin-hole registering therewith through said collar, and a pin which passes through said pin-holes to fasten the collar to the shaft and which is locked in position by the side plate of the neck when in assembled position.

14. A harp having mechanisms for raising the strings a semitone or a whole tone, cam-levers and intermediate mechanism connected therewith for operating the pitch-raising mechanisms, one operating-link connected with both sets of cams, the said link having an obtuse-angled arm at the upper end to which the upper cam-lever is pivoted, and an arm forming an offset to which the lower cam-lever is pivoted, pedal mechanism and intermediate connections to actuate said operating-link, and a tension-spring connected with said operating-link which restores it and the pedal mechanism to their normal position when the pedal is released after depression.

15. A harp having a neck, a series of forks for raising the strings a semitone and a series of forks for raising them another semitone, rock-shafts passing through the neck, said forks being mounted on the ends of said rock-shafts outside of the neck, chains formed of a series of links pivoted together, levers mounted on said rocker-shafts and pivoted to the said chains, rocking levers to which said chains are pivoted at each end, a cam-lever which actuates each chain, an operating-link connected with both of said cam-levers, pedal mechanism and intermediate mechanism connecting the pedal mechanism with the said operating-link, a tension-spring which restores the operating-link and pedal mechanism to their normal position when the pedal is released, and spiral springs mounted on said rock-shafts outside of the neck on the opposite ends from those to which the forks are attached which retain the chain-levers in engagement with said cam-levers.

16. A harp having mechanism for raising the pitch of the strings, pedal mechanism and intermediate mechanism connecting the pedal mechanism with said pitch-raising mechanism, and a mount for the pedal mechanism consisting of a segmental bar having outwardly-radiating arms for securing it to the pedal-box, and a cross-bar extending between the ends of the said segmental bar on the under side and connected therewith.

17. A harp having mechanisms for raising the pitch of the strings, levers and intermediate connecting mechanisms for operating the pitch-raising mechanisms, each operating-lever controlling the pitch-raising mechanism for all the strings of the same notation, a pedal for each operating-lever and a wire connecting each of said levers with its respective pedal, and a mount for the pedal mechanism consisting of a segmental bar having outwardly-extending arms which connect it with the pedal-box, a cross-bar uniting the two ends of said segmental bar on the under side thereof, the pedal-rods being pivoted at one end to said cross-bar, levers pivoted at one end to the lower ends of said operating-wires and pivoted at their other end to said segmental bar, one lever for each wire, and a link connecting each of said pedals with the lever which is pivoted to the lower end of the corresponding wire.

18. A harp having mechanisms for engaging the strings to raise the tone, operating mechanisms therefor, each of which controls all the strings of the same notation, a pedal for each operating mechanism, a mount for the pedal mechanism consisting of a segmental bar and a cross-bar uniting the two ends thereof on the under side, the pedal-rods being pivotally connected with said cross-bar, a separate operating-wire connected with each pitch-operating mechanism, a separate lever pivoted at one end to the lower end of each of said wires, bearings in which the other ends of said levers are journaled, said bearings being attached to inwardly-overhanging brackets on the upper side of said segmental bar, and a link connecting each of said levers with its corresponding pedal.

19. A harp having mechanisms for engaging the strings to raise the tone, operating mechanism therefor, pedal mechanism, a mount for the pedal mechanism, a pedal-rod pivotally connected at one end to said mount, a lever pivotally connected with said mount and flexibly connected with said pedal-rod, a wire connected at one end to the pitch-operating mechanism and pivotally connected at the other end to said lever, said connection between the said wire and lever being made by forming the lever with bifurcated end, a hole transversely through the ears formed by the bifurcation, a shaft journaled in said hole, a hole through said shaft at right angles to its axis, a nut threaded onto the end of said wire, and having a neck which enters between the ears of said lever and prevents axial movement of the said shaft but permits rocking movement.

20. A harp having mechanism for engaging the strings to raise the tone, pedal mechanism, intermediate mechanism actuated by the pedal mechanism to operate the pitch-raising mechanism, said intermediate mechanism including a wire whose lower end is pivotally connected with the pedal mechanism, said connection being made by forming in the pedal mechanism ears with perforations to receive the pivot-shaft, a pivot-shaft journaled in said ears, a hole through said shaft at right angles to its axis, a nut threaded onto the end of said wire and having a neck which enters between the ears of said lever and locks the said shaft against axial movement and permits rocking movement.

In testimony whereof I have affixed my signature in presence of two witnesses.

PER ERIK EKMAN.

Witnesses:
  WILLAM A. COPELAND,
  GUNNAR A. G. EKMAN.